(12) United States Patent
Dewbre

(10) Patent No.: US 10,558,904 B1
(45) Date of Patent: Feb. 11, 2020

(54) ELECTRONIC COMERCE PROTECTION SYSTEM

(71) Applicant: Lance Richard Dewbre, Double Oak, TX (US)

(72) Inventor: Lance Richard Dewbre, Double Oak, TX (US)

( * ) Notice: Subject to any disclaimer, the term of this patent is extended or adjusted under 35 U.S.C. 154(b) by 0 days.

(21) Appl. No.: 16/369,334

(22) Filed: Mar. 29, 2019

Related U.S. Application Data

(60) Provisional application No. 62/649,758, filed on Mar. 29, 2018.

(51) Int. Cl.
*G06K 19/073* (2006.01)
*A45C 13/20* (2006.01)

(52) U.S. Cl.
CPC ........ *G06K 19/07327* (2013.01); *A45C 13/20* (2013.01)

(58) Field of Classification Search
CPC .............................................. G06K 19/07327
See application file for complete search history.

(56) References Cited

U.S. PATENT DOCUMENTS

| | | | | |
|---|---|---|---|---|
| 2009/0067150 | A1* | 3/2009 | Ito | A45C 11/182 361/818 |
| 2010/0306972 | A1* | 12/2010 | Miltner | A45F 5/02 24/457 |
| 2014/0034520 | A1* | 2/2014 | Scicluna | A45C 1/00 206/37 |
| 2018/0049493 | A1* | 2/2018 | Graves | A41D 27/20 |

* cited by examiner

*Primary Examiner* — Hung V Ngo
(74) *Attorney, Agent, or Firm* — Richard Eldredge

(57) ABSTRACT

An electronic commerce protection system enables a person to safely carry credit, debit, gift cards or the like. The system prevents access to the data on the credit card from physical theft by attaching the system to a persons' boot or other article of clothing. The system prevents electronic or wireless reading of the data by shielding the card from malicious attacks.

3 Claims, 5 Drawing Sheets

ELECTRONIC COMERCE PROTECTION SYSTEM

BACKGROUND

1. Field of the Invention

The present invention relates generally to methods and systems for enabling commerce, and more specifically, to devices that allow users to carry credit, debit, gift cards or the like on their person.

2. Description of Related Art

Electronic commerce systems are well known in the art and are effective means to rapidly allow for the transfer of currency between two or more parties in a secure fashion and without the currency being present during the transaction. For example, FIG. 1 depicts a conventional credit card system 101 having a user 103 with a credit card 105 that is purchasing an item 107 from a vendor 109. During use, the credit card 105 is presented to the vendor 109 who validates the card via a network 111 and transfers the item 107 once approved.

One of the problems commonly associated with system 101 is its limited security. For example, the credit card 105 carries data that is intended to be accessible only by the user or other authorized parties but with the proliferation of electronic commerce systems theft of credit card data has become a problem. Theft of this data enables the thief to wrongfully incur debt or charges to the user. The data can be stolen with or without physical contact with the credit card.

Accordingly, although great strides have been made in the area of credit card systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
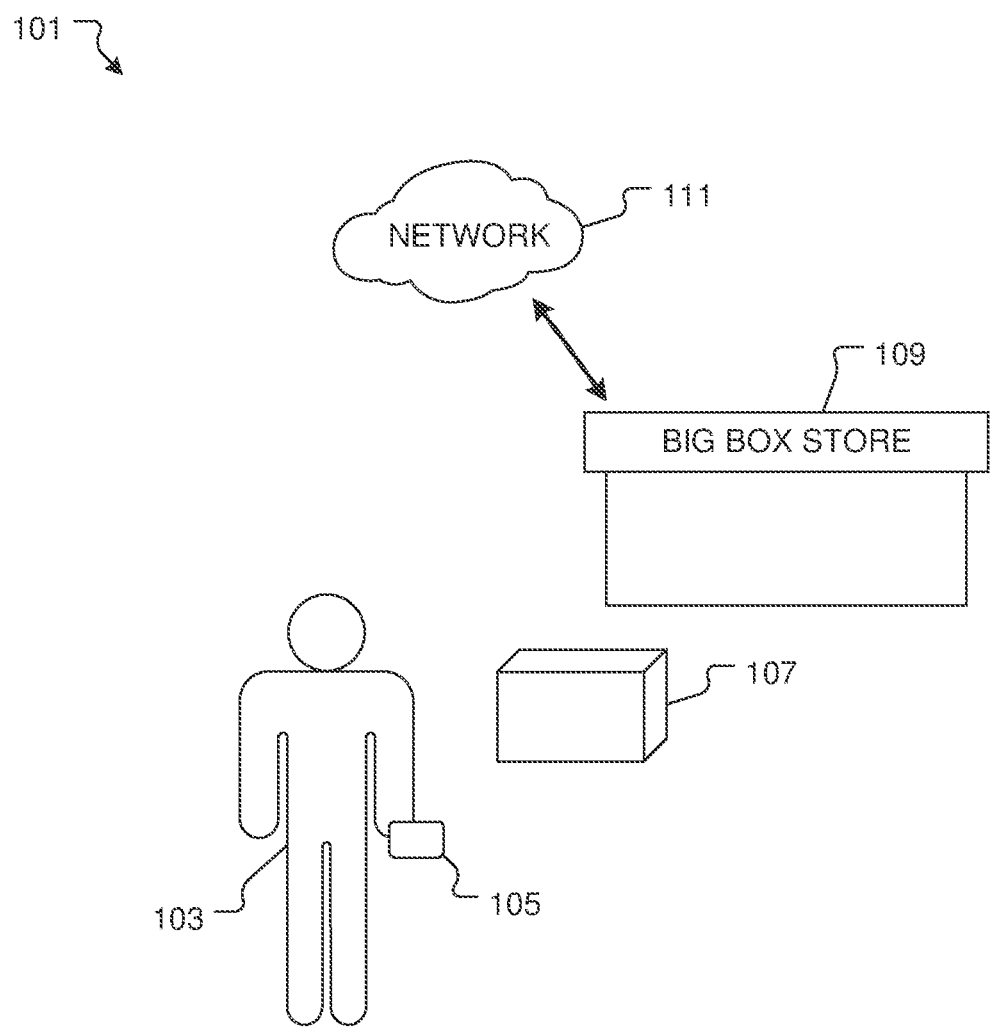
FIG. 1 is a diagram of a common credit card system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional credit card systems. Specifically, the invention of the present application allows a user to safely and securely carry and use a credit card or the like. The system prevents theft of the credit card data via physical or electronic means. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
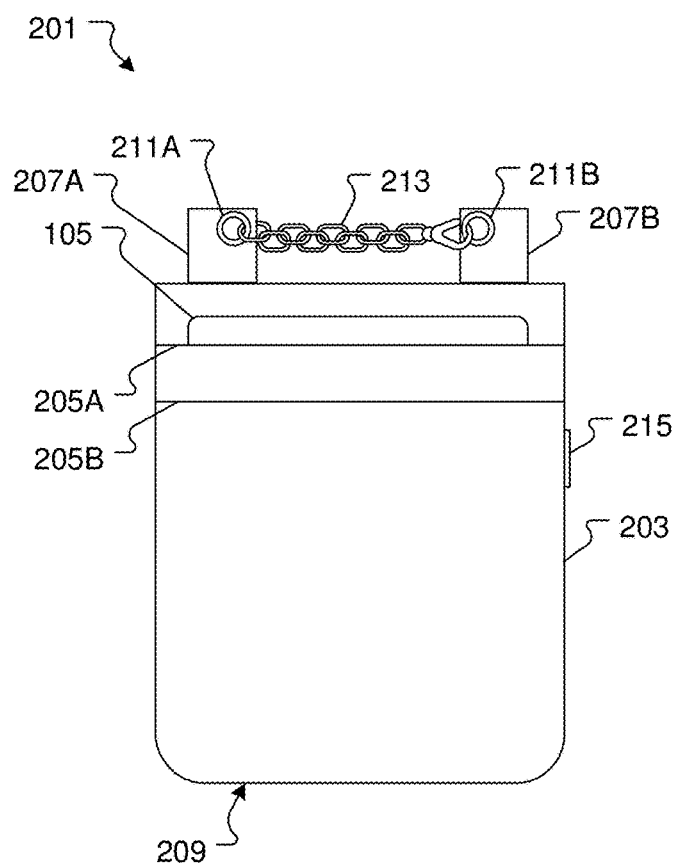
FIG. 2 is a front view of an electronic commerce protection system in accordance with a preferred embodiment of the present application.
Figure 3:
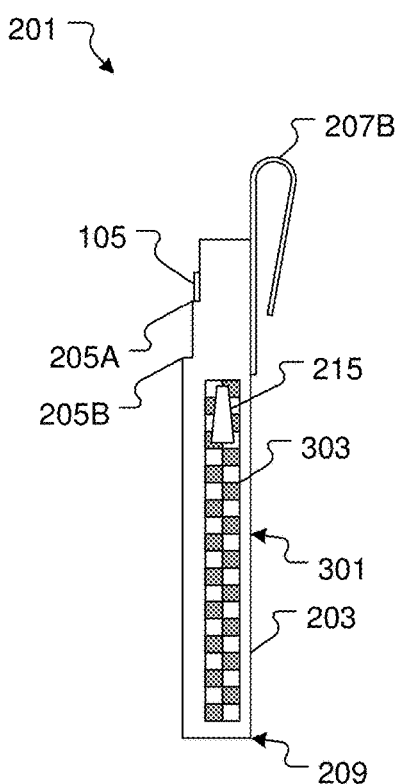
FIG. 3 is a side view of the system of FIG. 2.

Referring now to the drawings wherein like reference characters identify corresponding or similar elements throughout the several views, FIGS. 2 and 3 depict a front view and side view respectively of an electronic commerce protection system in accordance with a preferred embodiment of the present application. It will be appreciated that system 201 overcomes one or more of the above-listed problems commonly associated with conventional credit card systems.

In the contemplated embodiment, system 201 includes a body 203 that encloses slots 205 configured to hold a credit card 105, cash or the like. The body 203 having arms 207 attached to the back surface 301 and extending out and then back down and towards the back surface 301 and the bottom edge 209 thereof. The arms 207 having a chain and latch 213 attached there between via holes 211 passing therethrough.

The body 203 having a pocket 303 configured to store items such as keys, notes, coins and the like, and closable via a zipper 215.

Figure 4:
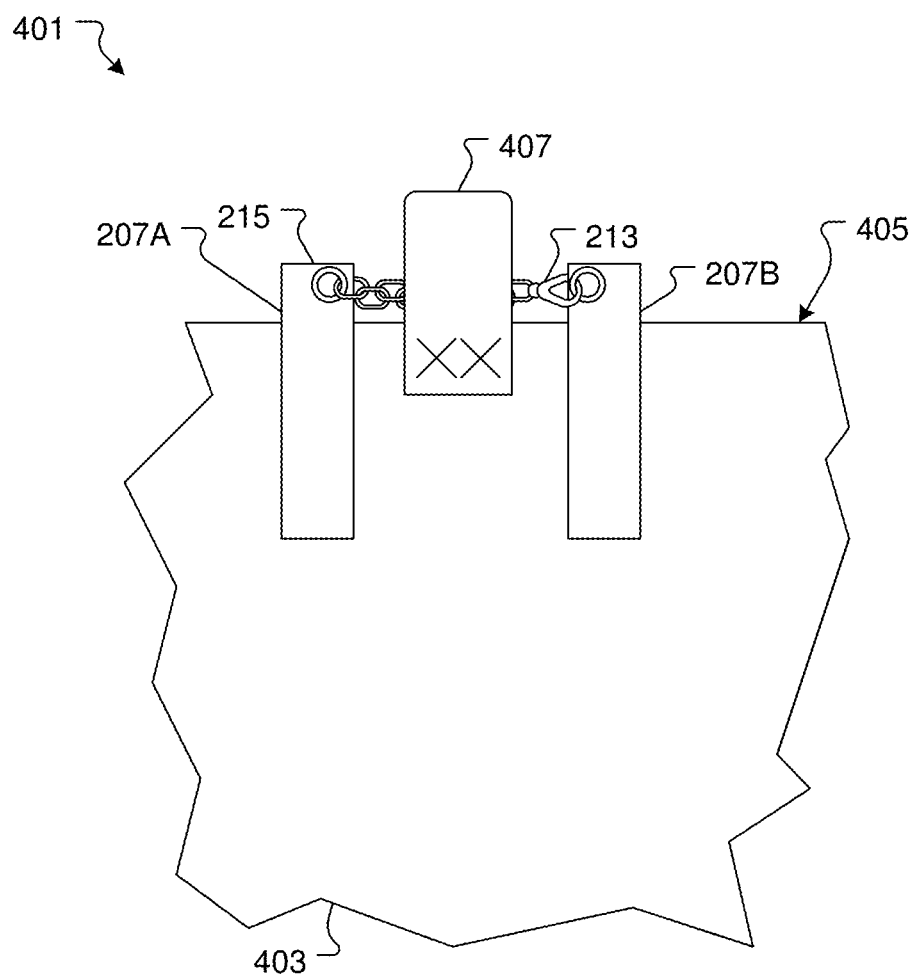
FIG. 4 is a back view of the system of FIG. 2 in use.

The arms 207 being configured to attach the body 203 to a boot 403 as depicted in FIG. 4. The arms 207 fit over the rim 405 of the boot 403. So that the boot 403 has pressure applied to it by the arms 207 and the back surface 301 of the body 203. The chain and latch 213 is passed through or attached to the loop 407 of the boot 403.

In use, the credit card 105 or the like is placed in the slot 205 and the body is carried by a user in a boot 403.

It should be appreciated that one of the unique features believed characteristic of the present application is that the arms 207 and chain and latch 213 enable the system 201 to be carried out of physical reach of potential thieves in a secure manner.

Figure 5:
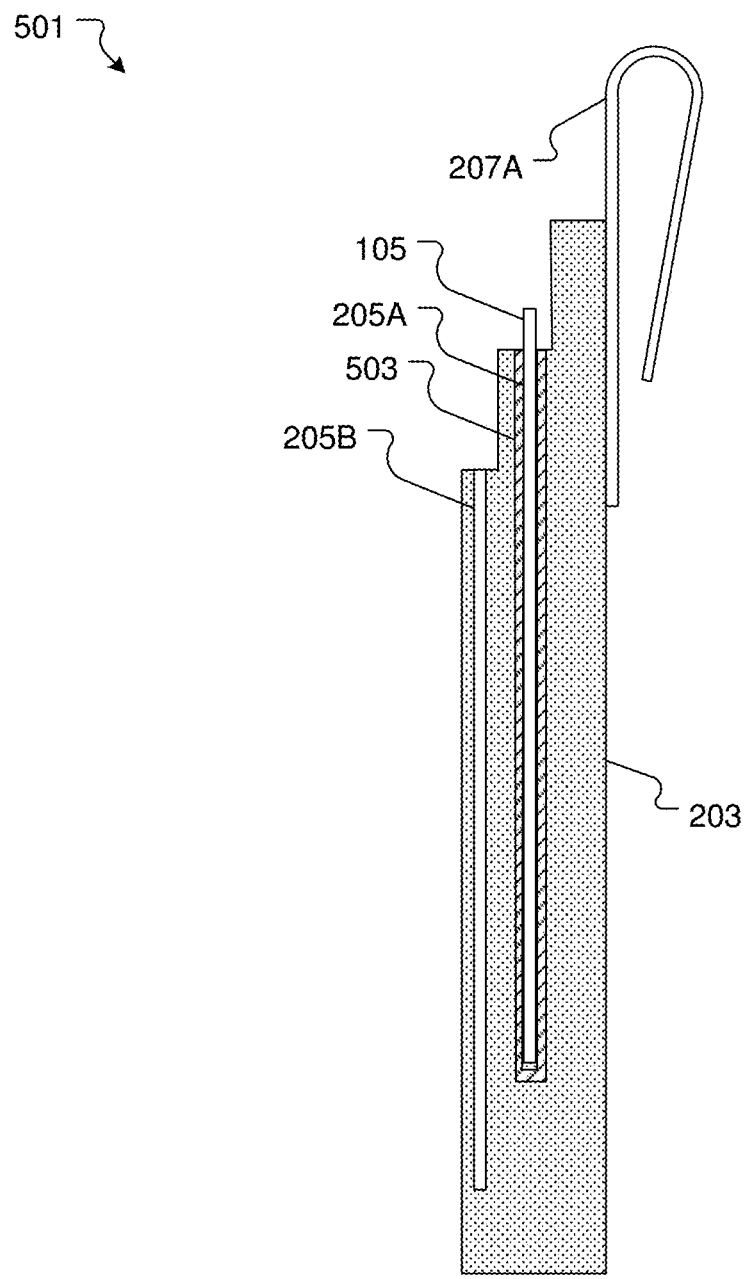
FIG. 5 is a cross-sectional side view of an alternative embodiment of the system of FIG. 2.

Referring now to FIG. 5 an alternative embodiment of the system 201 is depicted. Embodiment 501 including similar features as system 201 with the addition of a shielding layer 503 on either side of the slot 205A.

It will be appreciated that the shielding layers 503 protect the data on credit card 105 from theft via electronic means.

Figure 6:
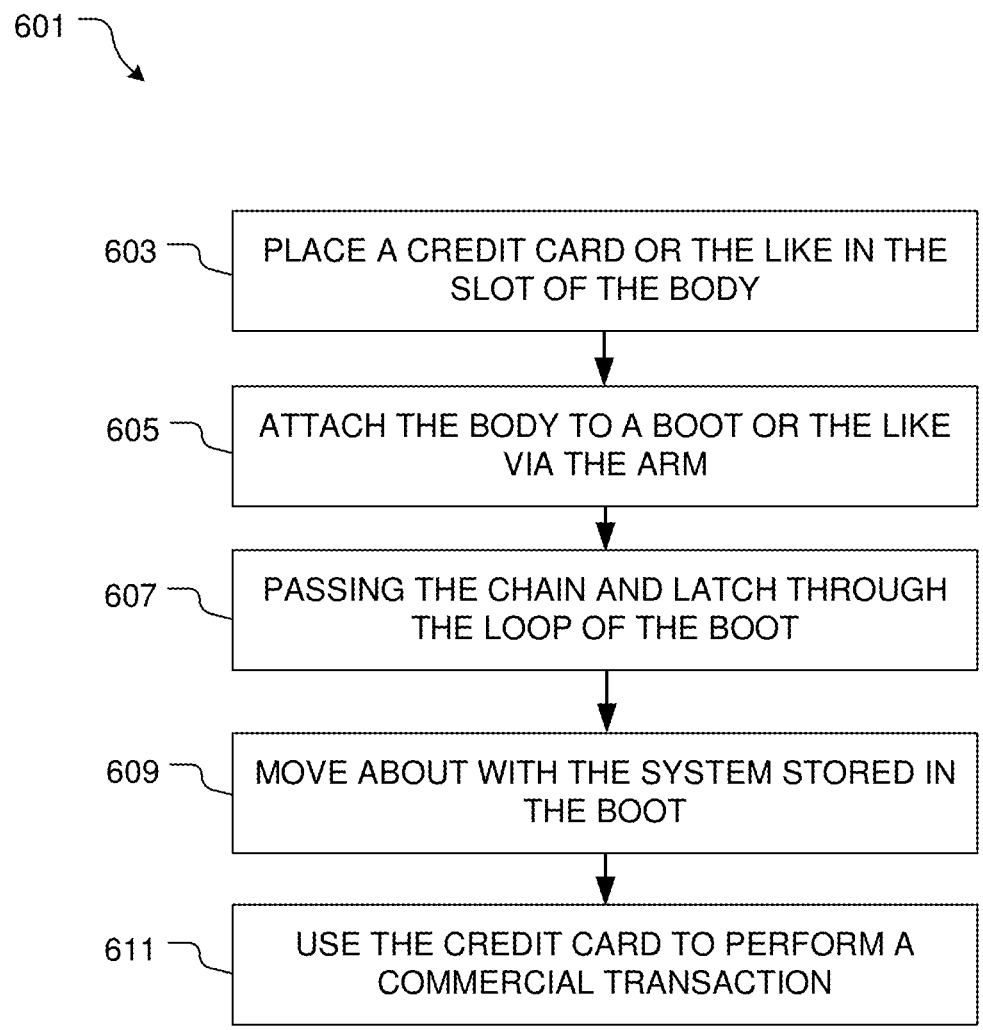
FIG. 6 is a flowchart of the preferred method of use of the system of FIG. 2 or FIG. 4.

Referring now to FIG. 6 the preferred method of use of the system is depicted. Method 601 including placing a credit card in a slot of the body 603, attaching the body to a boot via the arms passing over the rim of the boot 605, passing the chain and latch through the loop of the boot 607, moving about with the system stored in the boot 609 and using the credit card to perform commercial transactions 611.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. An electronic commerce protection system comprising:
   a body having:
      a top surface;
      a side surface;
      a front surface; and
      a back surface;
   a slot on the front surface and configured to hold at least one credit card;
   a pocket on the side of the body and forming a cavity within the body;
   a zipper secured to the side of the body and configured to open and close access to the pocket;
   a first arm secured to the top surface and extending toward the back surface in a looped fashion;
   a second arm secured to the top surface and extending toward the back surface in a looped fashion; and
   a removable chain removably secured to both the first arm and the second arm.

2. The system of claim 1 wherein the slot has at least one shielding layer.

3. The method of protecting the data of a credit card, comprising:
   providing the system of claim 1;
   placing a credit card in the slot of the body;
   attaching the body to a boot via the first arm by passing over the rim of the boot;
   passing the chain through a loop of the boot;
   moving about with the system of claim 1 stored in the boot; and
   using the credit card to perform commercial transactions.

* * * * *